(12) United States Patent
Chen et al.

(10) Patent No.: US 8,032,036 B2
(45) Date of Patent: Oct. 4, 2011

(54) DQPSK/DPSK OPTICAL RECEIVER WITH TUNABLE OPTICAL FIBERS

(75) Inventors: David Zhi Chen, Richardson, TX (US); E. Evert Basch, Stow, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 854 days.

(21) Appl. No.: 11/953,220

(22) Filed: Dec. 10, 2007

(65) Prior Publication Data

US 2009/0148171 A1    Jun. 11, 2009

(51) Int. Cl.
*H04B 10/06* (2006.01)

(52) U.S. Cl. ........ 398/202; 398/208; 398/209; 398/212; 398/213; 398/188

(58) Field of Classification Search .......... 398/183, 398/188, 202, 208, 209, 213, 214, 158, 159, 398/81, 79, 212, 203, 204, 205, 206, 207, 398/140, 141, 161

See application file for complete search history.

(56) References Cited

U.S. PATENT DOCUMENTS

| | | | |
|---|---|---|---|
| 7,526,210 B2 * | 4/2009 | Liu | 398/188 |
| 2006/0171720 A1 * | 8/2006 | Agarwal et al. | 398/186 |
| 2007/0047971 A1 * | 3/2007 | Ikeuchi | 398/202 |
| 2009/0116851 A1 * | 5/2009 | Heffner et al. | 398/208 |
| 2010/0111540 A1 * | 5/2010 | Caplan et al. | 398/140 |

* cited by examiner

*Primary Examiner* — Hanh Phan (57) ABSTRACT

An optical receiver includes a first interferometer having a plurality of arms. The optical receiver further includes first tunable optical filters connected in series with the arms of the first interferometer, where each first tunable optical filter is tuned to filter a region of overlap in the optical frequency spectrum between adjacent optical channels.

25 Claims, 13 Drawing Sheets

DQPSK/DPSK OPTICAL RECEIVER WITH TUNABLE OPTICAL FIBERS

BACKGROUND

Differential Phase Shift Keying (DPSK) and differential quadrature phase shift keying (DQPSK) are modulation techniques used in optical data transmission. Dense Wavelength Divisional Multiplexing (DWDM) transmission has been demonstrated over substantial optical fiber distances at high rates (e.g., 100 Gb/s) using either DPSK or DQPSK.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein use tunable optical filters in an optical receiver's interferometer(s) to reduce channel overlap (e.g., cross talk) between adjacent optical channels in a DQPSK or DPSK modulated system. When narrow channel spacing is employed, spectrum broadening due to fiber dispersion and non-linearity can create regions of substantial channel overlap that reduce system performance. Use of tunable optical filters in the DQPSK/DPSK receiver, as described herein, reduces this channel overlap and improves optical performance in a number of ways that are further described below. Exemplary embodiments described herein have particular applicability to high speed (e.g., 100 Gb/s) DQPSK/DPSK systems that employ narrow channel spacing.

Figure 1:
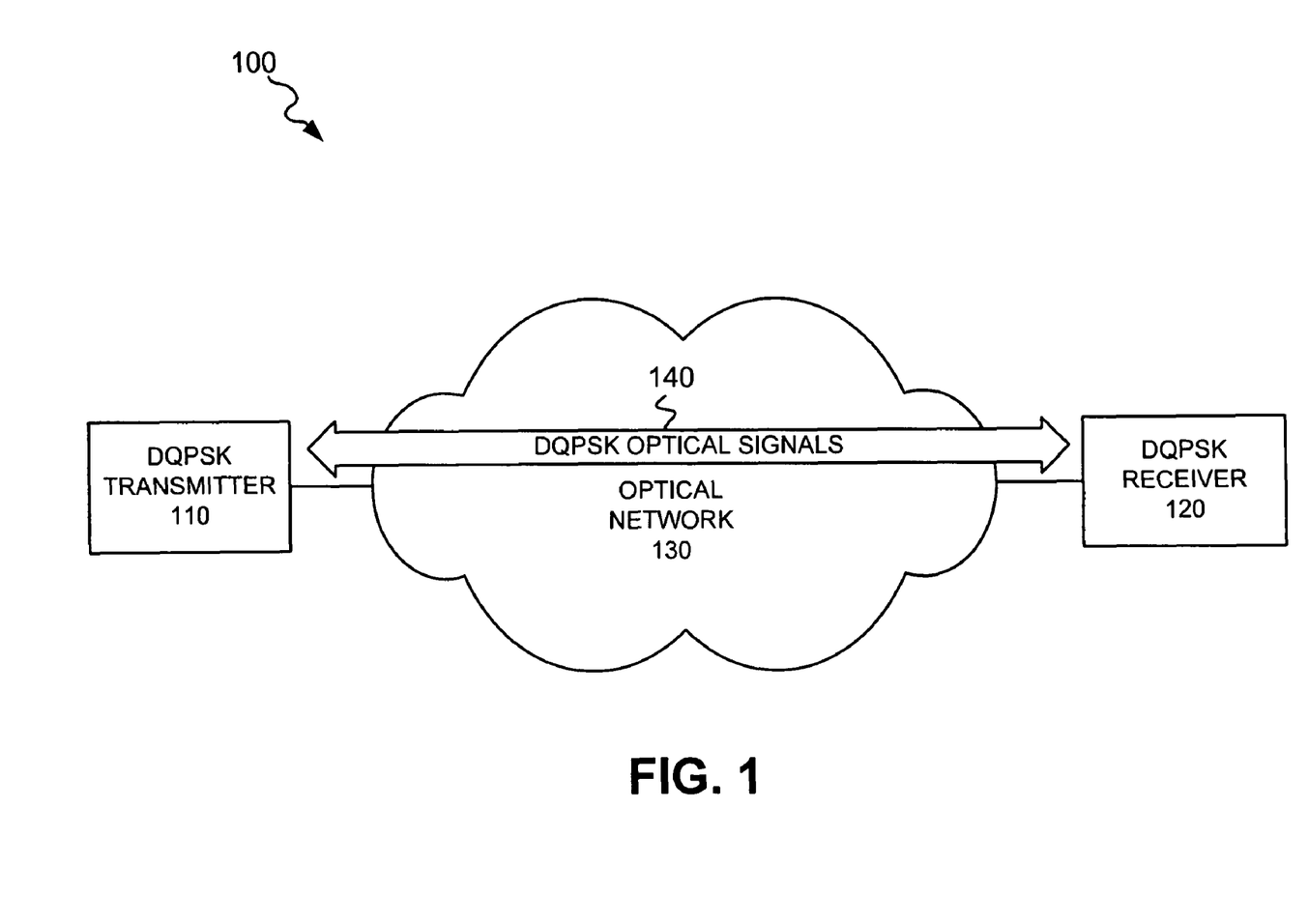
FIG. 1 is a diagram of a network according to an exemplary implementation.

FIG. 1 is a diagram of a network 100 according to an exemplary implementation. Network 100 may include a DQPSK transmitter 110, a DQPSK receiver 120 and an optical network 130. As shown in FIG. 1, DQPSK transmitter 110 may transmit DWDM DQPSK optical signals 140 to DQPSK receiver 120 via optical network 130. DQPSK transmitter 110 may include an optical transmitter that uses DQPSK techniques for modulating optical signals to encode the signals with data and for transmitting the modulated optical signals across optical network 130 to DQPSK receiver 120. DQPSK receiver 120 may include an optical receiver that uses DQPSK techniques for receiving and demodulating optical signals received from DQPSK transmitter 110 via optical network 130 and for extracting the original data from the modulated optical signals. Optical network 130 may include, for example, an optical fiber network which carries optical signals from one or more transmitters to one or more receivers. According to other exemplary embodiments (not shown), transmitter 110 may include a DPSK transmitter, instead of a DQPSK transmitter, and receiver 120 may include a DPSK receiver, instead of a DQPSK receiver.

Figure 2A:
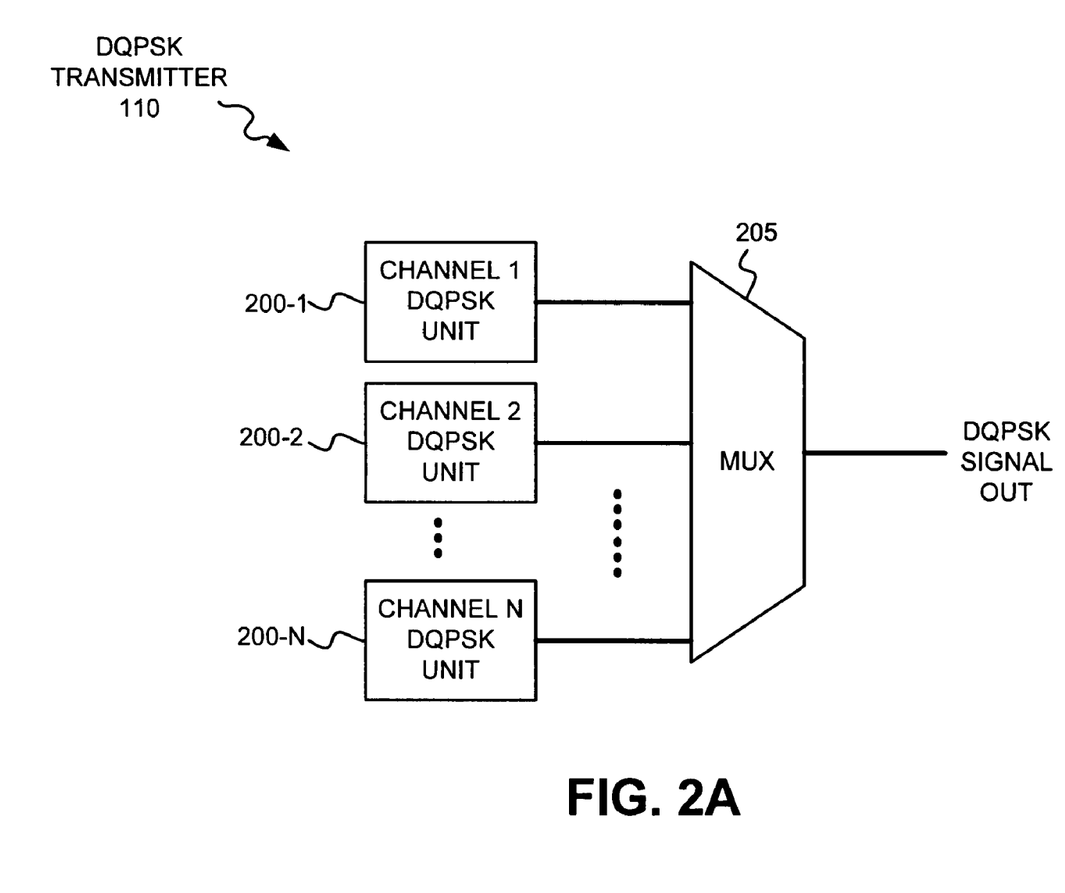
FIG. 2A is a diagram of an exemplary configuration of the DQPSK transmitter of FIG. 1.

FIG. 2A illustrates an exemplary configuration of DQPSK transmitter 110. As shown in FIG. 2A, DQPSK transmitter 110 may include one or more channel DQPSK units 200-1 through 200-N (individually and generically referred to herein as a "channel DQPSK unit 200-x") and a multiplexer 205. Each channel DQPSK unit 200-x may include components for transmitting data via optical pulses over a specific optical channel. Each DQPSK unit 200-x, thus, may transmit data over a different optical channel (e.g., at a different optical wavelength). Multiplexer 205 may include a wavelength division multiplexing device that multiplexes different channels of optical signals into an optical fiber. Multiplexer 205 may include, for example, an optical add-drop multiplexer (OADM). Multiplexer 205 may multiplex optical pulses of the different channels transmitted by channel DQPSK units 200-1 through 200-N to produce a DQPSK signal out.

Figure 2B:
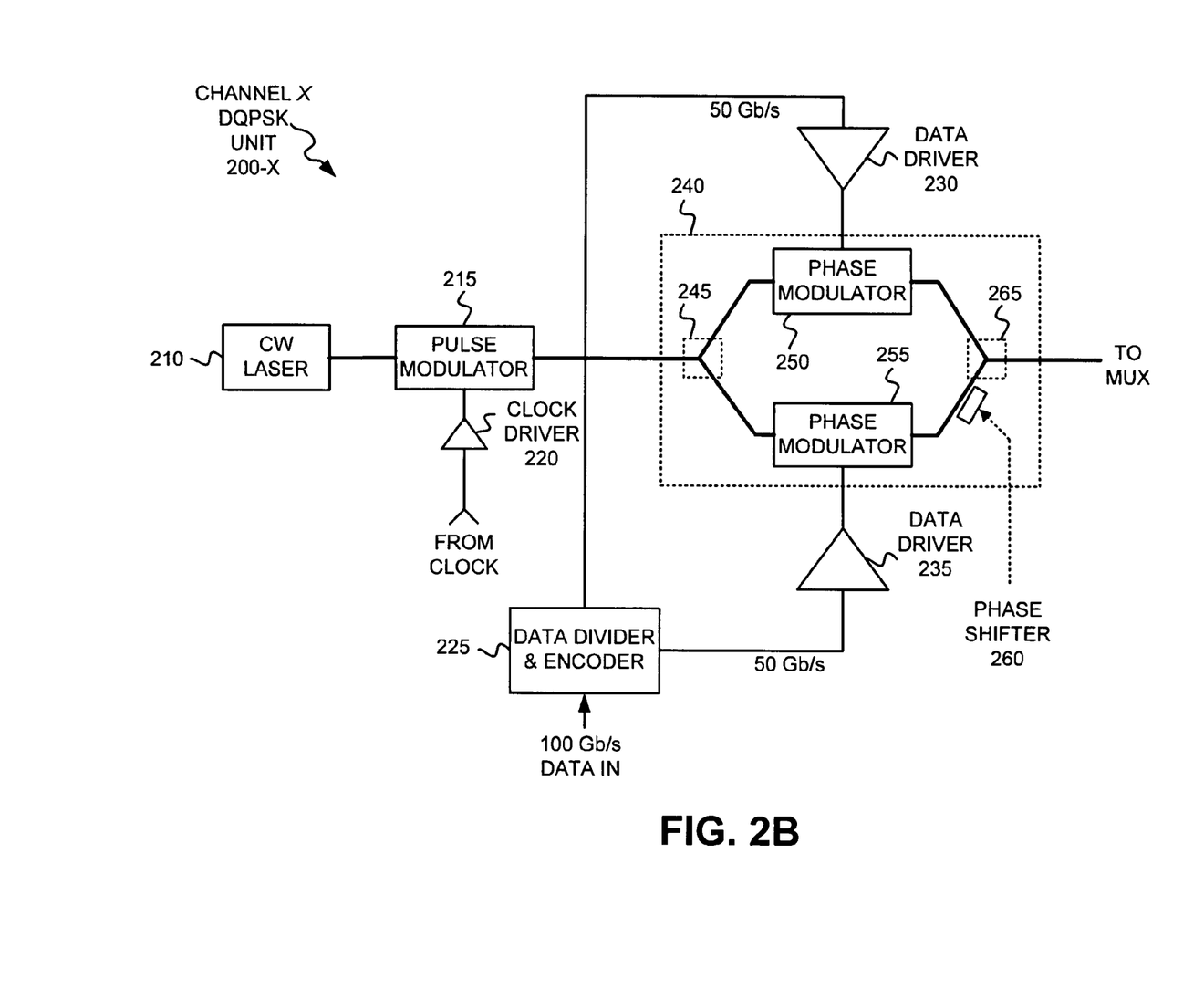
FIG. 2B is a diagram of an exemplary configuration of a channel DQPSK unit of the DQPSK transmitter of FIG. 2A.

FIG. 2B is a diagram of an exemplary configuration of a channel DQPSK unit 200-x. As depicted in the exemplary configuration of FIG. 2B, DQPSK unit 200-x may include a continuous wave (CW) laser 210, a pulse modulator 215, a clock driver 220, a data divider and encoder 225, data drivers 230 and 235, and an interferometer 240.

CW laser 210 may include a laser source that produces optical CW carrier signals at a given wavelength (e.g., a single channel). Pulse modulator 215 may pulse modulate the carrier signal from CW laser 210, based on clock signals received from clock driver 220, to generate optical pulses. Data divider and encoder 225 may include circuitry for dividing the data to be transmitted (e.g., data at 100 Gb/s) into two streams of data (e.g., 50 Gb/s for each data stream) and may encode each stream of data for providing to data drivers 230 and 235. Data driver 230 may output signals, based on encoded data received from data divider and encoder 225, to one arm of interferometer 240. Data driver 235 may output signals, based on encoded data received from data divider and encoder 225, to another arm of interferometer 240.

Interferometer 240 may include an optical splitter 245, a first phase modulator 250, a second phase modulator 255, a phase shifter 260 and an optical coupler 265. Optical splitter 245 may split an incoming optical pulse into two substantially identical pulses and provide each of the optical pulses to a different arm of interferometer 240. One of the optical pulses from splitter 245 may be provided to phase modulator 250 in a first arm of interferometer 240, and the other to phase modulator 255 in a second arm of interferometer 240. Phase modulator 250 may modulate the phase of the received optical pulse based on signals received from data driver 230. Phase modulator 255 may modulate the phase of the received carrier wave optical pulse based on signals received from data driver 235. Phase modulator 255 may provide the phase modulated optical pulse to phase shifter 260, which may then phase shift the modulated carrier wave signal a specified amount. In one implementation, phase shifter 260 may include a π/2 phase shifter that induces 90 degrees of phase shift in the phase modulated optical pulse. The phase shifted optical pulse output from phase shifter 260 may be provided to optical coupler 265. Optical coupler 265 may include, for example, a 50/50 coupler and may couple the phase modulated optical pulses from phase modulator 250 and from phase modulator 255 to provide an output signal that can be provided to MUX 205 for multiplexing.

Figure 3A:
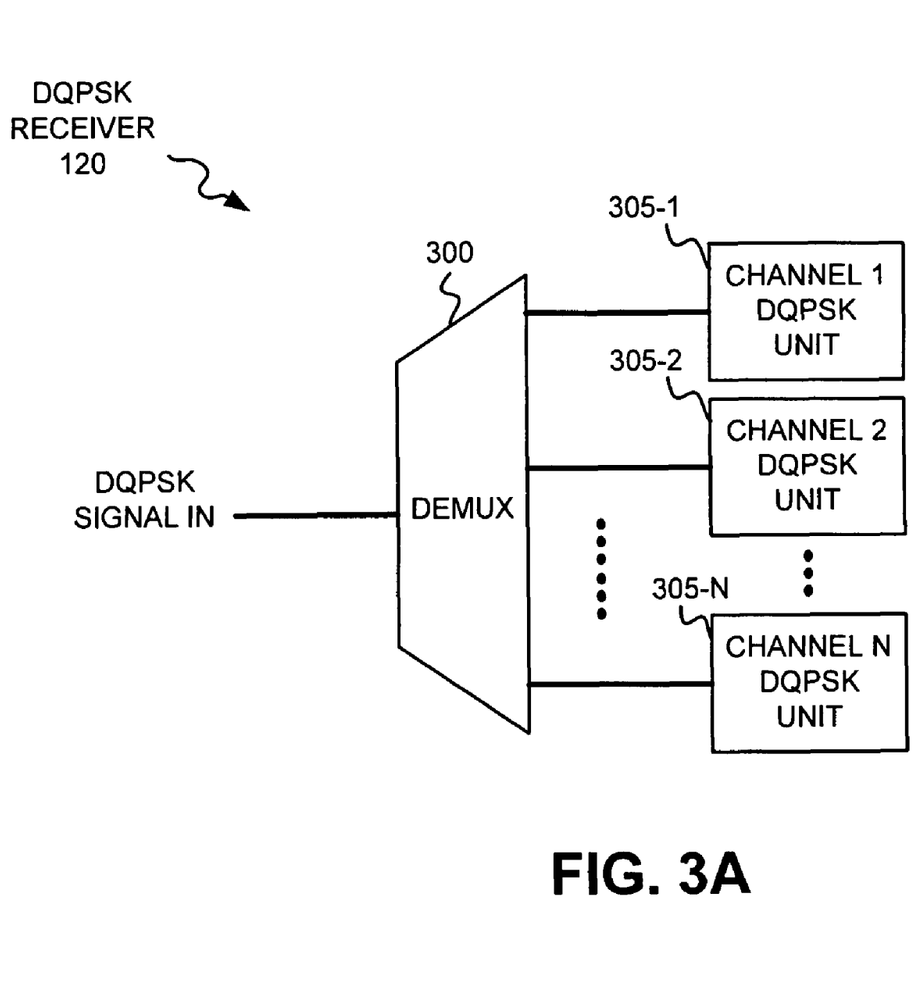
FIG. 3A is a diagram of an exemplary configuration of the DQPSK receiver of FIG. 1.

FIG. 3A illustrates an exemplary configuration of DQPSK receiver 120. As shown in FIG. 3A, DQPSK receiver 120 may include a demultiplexer 300 and one or more channel DQPSK units 305-1 through 305-N (individually and generically referred to herein as a "channel DQPSK unit 305-x"). Demultiplexer 300 may include a wavelength division demultiplexing device that demultiplexes different channels of optical signals out of an optical fiber for provision to different ones of DQPSK units 305-1 through 305-N. For example, demultiplexer 300 receives the DQPSK signal in, which includes optical signals in multiple channels (e.g., channels 1 through N) and demultiplexes signals from each channel to a respective channel DQPSK unit 305-x. Each of channel DQPSK units 305-1 through 305-N demodulates the received optical signals in a respective optical channel to retrieve the data encoded in the optical signals.

Figure 3B:
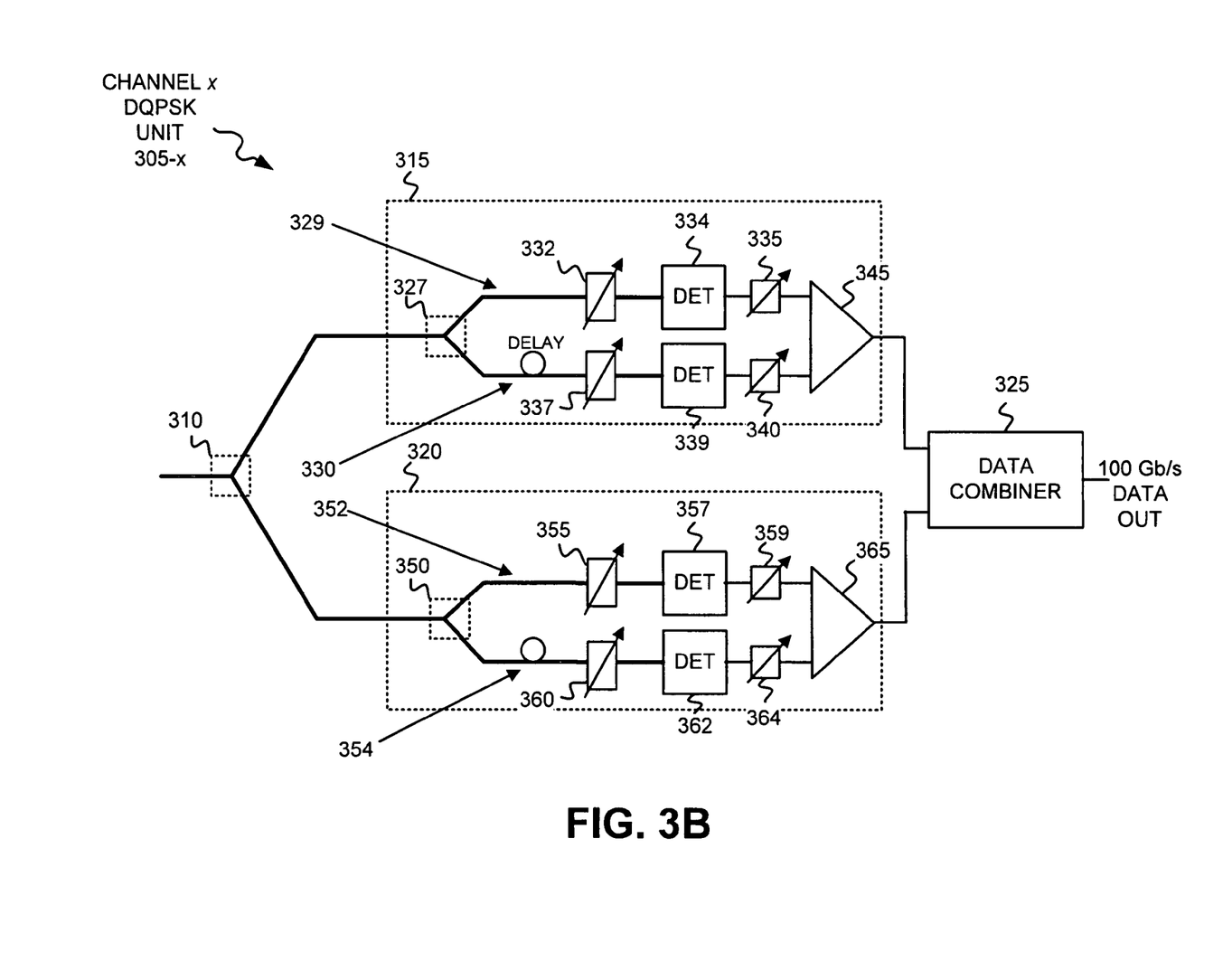
FIG. 3B is a diagram of an exemplary configuration of a channel DQPSK unit of the DQPSK receiver of FIG. 3A.

FIG. 3B is a diagram that illustrates an exemplary configuration of a channel DQPSK unit 305-x. As depicted in FIG. 3B, channel DQPSK unit 305-x may include an optical splitter 310, a first interferometer 315, a second interferometer 320 and a data combiner 325. Optical splitter 310 may split each DQPSK optical pulse received from demultiplexer 300 into two DQPSK optical pulses and may provide a first one of the pulses to interferometer 315 and a second one of the pulses to interferometer 320.

Interferometer 315 may include an optical splitter 327 that connects to a first arm 329 and a second arm 330 of interferometer 315. Optical splitter 327 may split an incoming optical pulse into two substantially identical pulses and provide each of the optical pulses to a different arm of interferometer 315 (i.e., one pulse to arm 329 and another pulse to arm 330). Arm 329 may include a tunable optical filter 332 and a photodetector 334. Arm 329 may optionally also include a tunable electrical filter 335 connected to the output of photodetector 334. Arm 330 may include a tunable optical filter 337 and a photodetector 339. Arm 330 may optionally also include a tunable electrical filter 340 connected to the output of photodetector 339. Tunable optical filters 332 and 337 may be appropriately tuned to filter channel overlap regions, as further described below, and reduce channel cross-talk. Optional tunable electrical filters 335 and 340 may also be tuned, in conjunction with the tuning of optical filters 332 and 337, to reduce excessive frequency domain overlapping and thereby reduce frequency overlapping noise. Tunable optical filters 332 and 337 may include tunable optical band reject filters, such as, for example, narrowband optical tunable thin filter filters. Photodetectors 334 and 339 detect each received optical pulse and convert the optical pulse into an output electrical signal. Photodetectors 334 and 339 may include positive intrinsic negative (PIN) diodes, avalanche photo detectors (APDs), and/or photo-multiplier tubes (PMTs). The electrical signal output from photodetectors 334 and 339 may be input into a comparator 355 (or into filters 335 and 340 and then into comparator 345). Arm 330 may induce a delay (e.g., a one pulse delay) in received optical pulses relative to optical pulses received at arm 329 of interferometer 315. Thus, for any given pulse detected at photodetector 334 of arm 329, the previous optical pulse will be detected at photodetector 339 enabling comparator 355 to subtract the electrical signals from one another to determine the phase difference between sequential optical pulses.

Interferometer 320 may include an optical splitter 350 that connects to a first arm 352 and a second arm 354 of interferometer 320. Optical splitter 350 may split an incoming optical pulse into two substantially identical pulses and provide each of the optical pulses to a different arm of interferometer 320 (i.e., one pulse to arm 352 and another pulse to arm 354). Arm 352 may include a tunable optical filter 355 and a photodetector 357. Arm 352 may optionally also include a tunable electrical filter 359 connected to the output of photodetector 357. Arm 354 may include a tunable optical filter 360 and a photodetector 362. Arm 354 may optionally also include a tunable electric filter 364 connected to the output of photodetector 362. Tunable optical filters 355 and 360 may be appropriately tuned to filter channel overlap regions, as further described below, and reduce channel cross-talk. Optional tunable electrical filters 359 and 364 may also be tuned, in conjunction with the tuning of optical filters 355 and 360, to reduce excessive frequency domain overlapping and thereby reduce frequency overlapping noise. Tunable optical filters 355 and 360 may include tunable optical band reject filters, such as, for example, narrowband optical tunable thin filter filters. Photodetectors 357 and 362 may detect each received optical pulse and convert the optical pulse into an output electrical signal. Photodetectors 357 and 362 may include positive intrinsic negative (PIN) diodes, avalanche photo detectors (APDs), and/or photo-multiplier tubes (PMTs). The electrical signal output from photodetectors 357 and 362 may be input into a comparator 365 (or into filters 359 and 364 and then into comparator 365). Arm 354 may induce a delay (e.g., a one pulse delay) in received optical pulses relative to optical pulses received at arm 352 of interferometer 320. Thus, for any given pulse detected at photodetector 357 of arm 352, the previous optical pulse will be detected at photodetector 362 enabling comparator 365 to subtract the electrical signals from one another to determine the phase difference between sequential optical pulses.

Data combiner 325 may receive the phase difference signals from comparators 345 and 365 and may determine the data values (e.g., 00, 01, 10, 11) that correspond to those phase difference signals.

Figure 4:
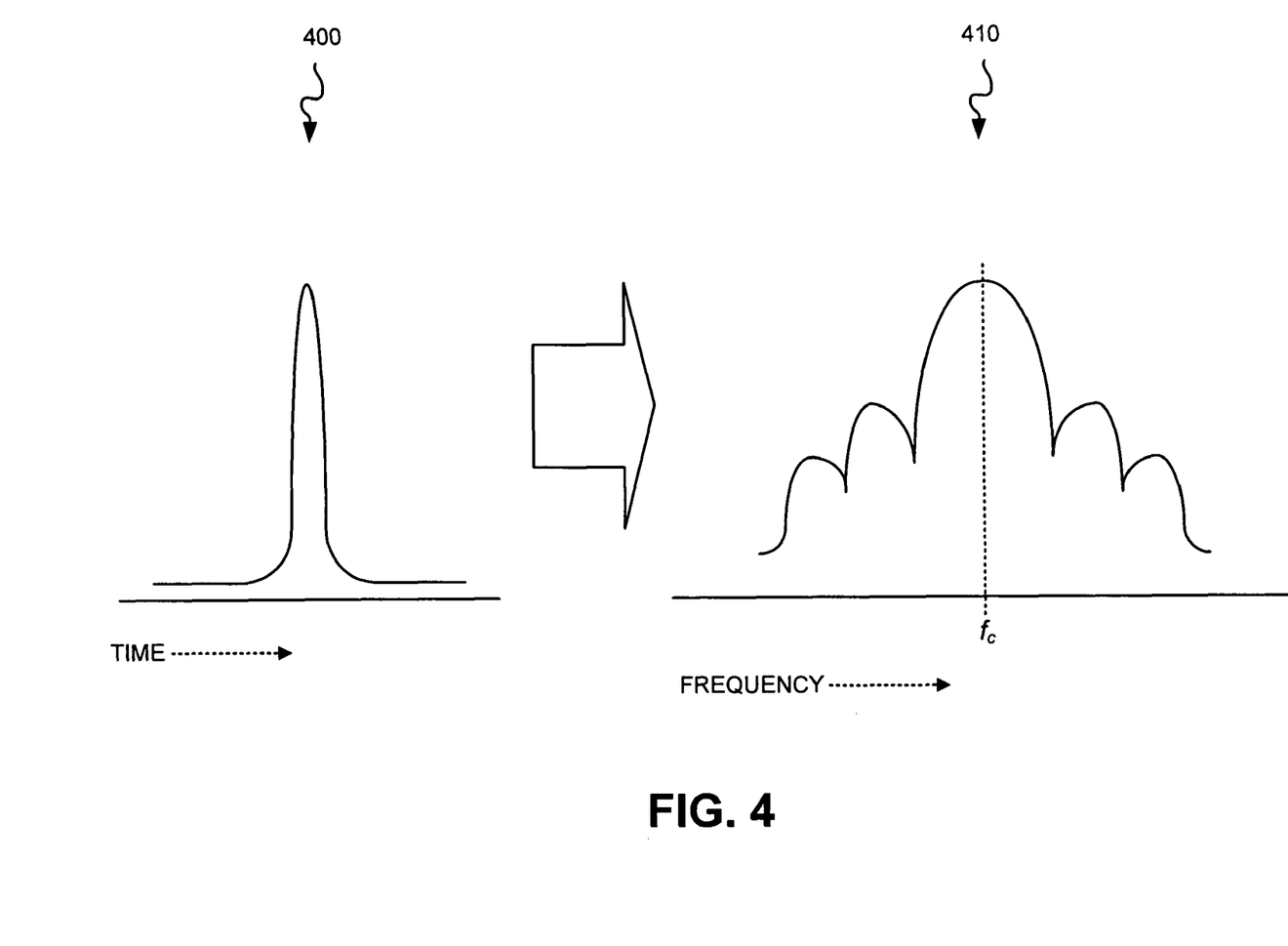
FIG. 4 illustrates an exemplary narrow optical pulse emitted by the pulse modulator of FIG. 2 in the time domain and the frequency domain.
Figure 5:
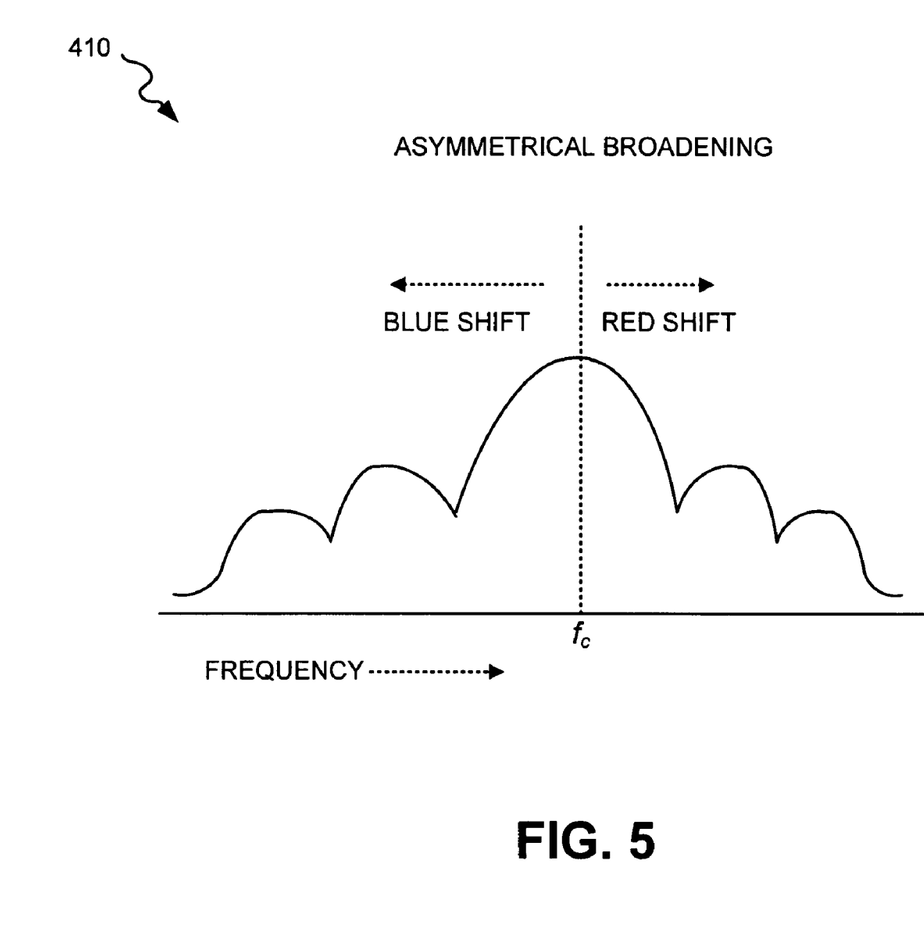
FIG. 5 illustrates the frequency domain spectrum of FIG. 4 broadened with asymmetric blue and red shift due to fiber dispersion and non-linearity.

FIG. 4 depicts an example of an optical pulse 400, in the time domain, which may be emitted by pulse modulator 215 of a channel DQPSK unit 200-x of DQPSK transmitter 110. As further shown in FIG. 4, the time domain optical pulse 400 may have a corresponding optical spectrum 410 in the frequency domain. As additionally depicted in FIG. 5, the optical spectrum 410 associated with optical pulse 400 can undergo asymmetric broadening, with asymmetric blue and red shifts, as optical pulse 400 traverses optical network 130 from transmitter 110 to receiver 120 due to fiber dispersion and non-linearity.

Figure 6:
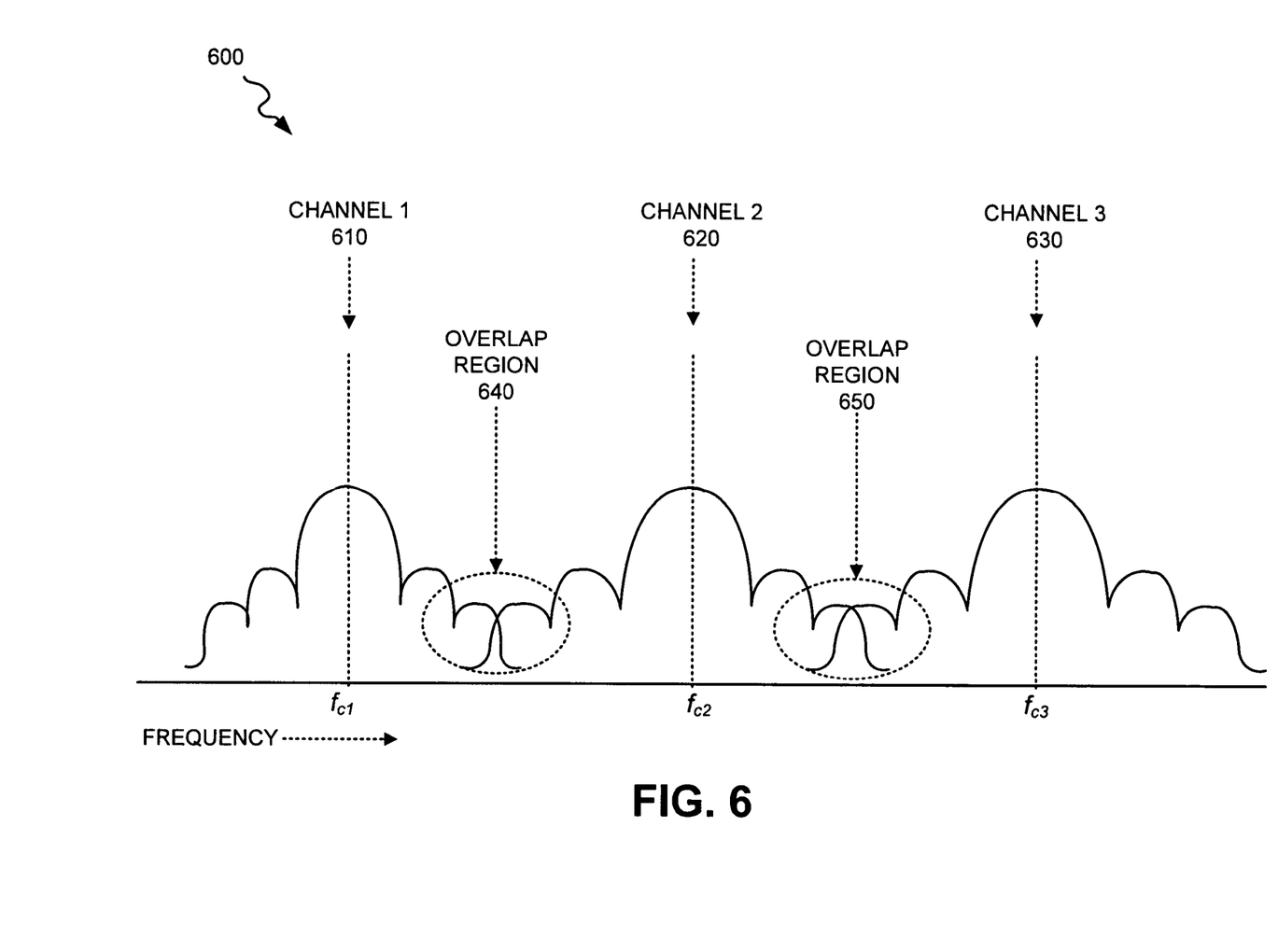
FIG. 6 illustrates three exemplary optical channels, with wide channel spacing, such that there is very little overlap between the channel spectrums.

FIG. 6 further depicts the use of multiple channels (e.g., multiple different optical wavelengths) for transmitting data between transmitter 110 and receiver 120 via optical network 130. In the example of FIG. 6, the channel spacing is set relatively far apart, resulting in very little channel spectrum and phase overlap. As shown in FIG. 6, a multi-channel frequency spectrum 600 may include channel 1 610, channel 2 620 and channel 3 630, with each having respective center frequencies $f_{c1}$, $f_{c2}$ and $f_{c3}$. As further shown in FIG. 6, overlap regions exist (e.g., overlap region 640 between channel 1 610 and channel 2 620 and overlap region 650 between channel 2 620 and channel 3 630) that have minimal overlap between the spectrums of the adjacent channels.

Figure 7A:
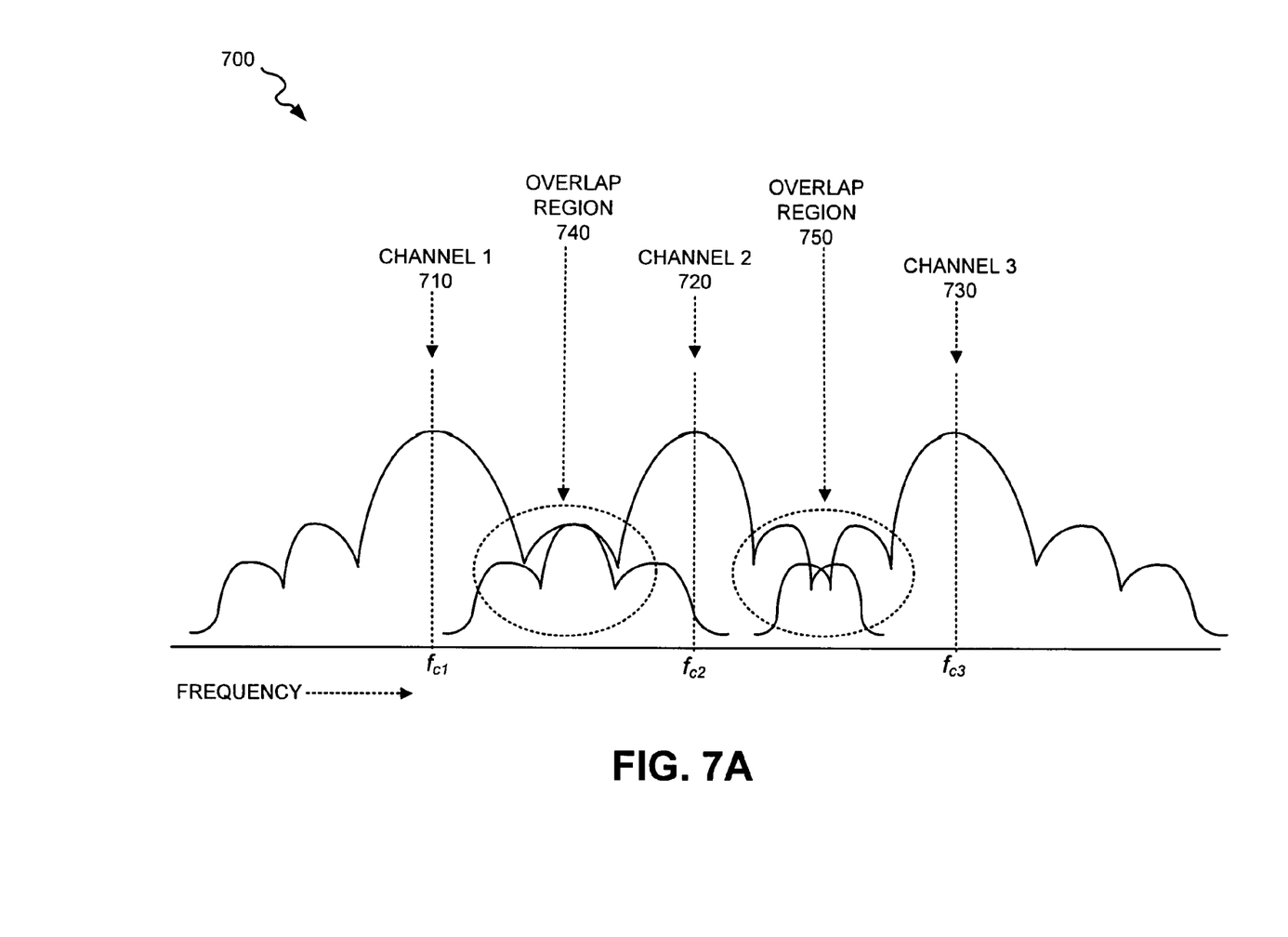
FIG. 7A illustrates three exemplary optical channels, with narrow channel spacing, having substantial overlap between the channel spectrums.

In the case where narrow channel spacing is employed, such as in the example shown in FIG. 7A, a relatively large amount of undesirable channel spectrum and phase overlap occurs. As depicted in FIG. 7A, a multi-channel frequency spectrum 700 may include channel 1 710, channel 2 720 and channel 3 730, with each having respective center frequencies $f_{c1}$, $f_{c2}$ and $f_{c3}$. As further shown in FIG. 7A, overlap regions exist (e.g., overlap region 740 between channel 1 710 and channel 2 720, and overlap region 750 between channel 2 720 and channel 3 730) that have substantial overlap between the spectrums of the adjacent channels (e.g., substantial crosstalk between channels). Overlap regions between adjacent channels that have been asymmetrically broadened may have significantly increased channel overlap. For example, overlap region 740 between channel 1 710 and channel 2 720 includes a large channel overlap due to asymmetric broadening of the channel spectrum.

Figure 7B:
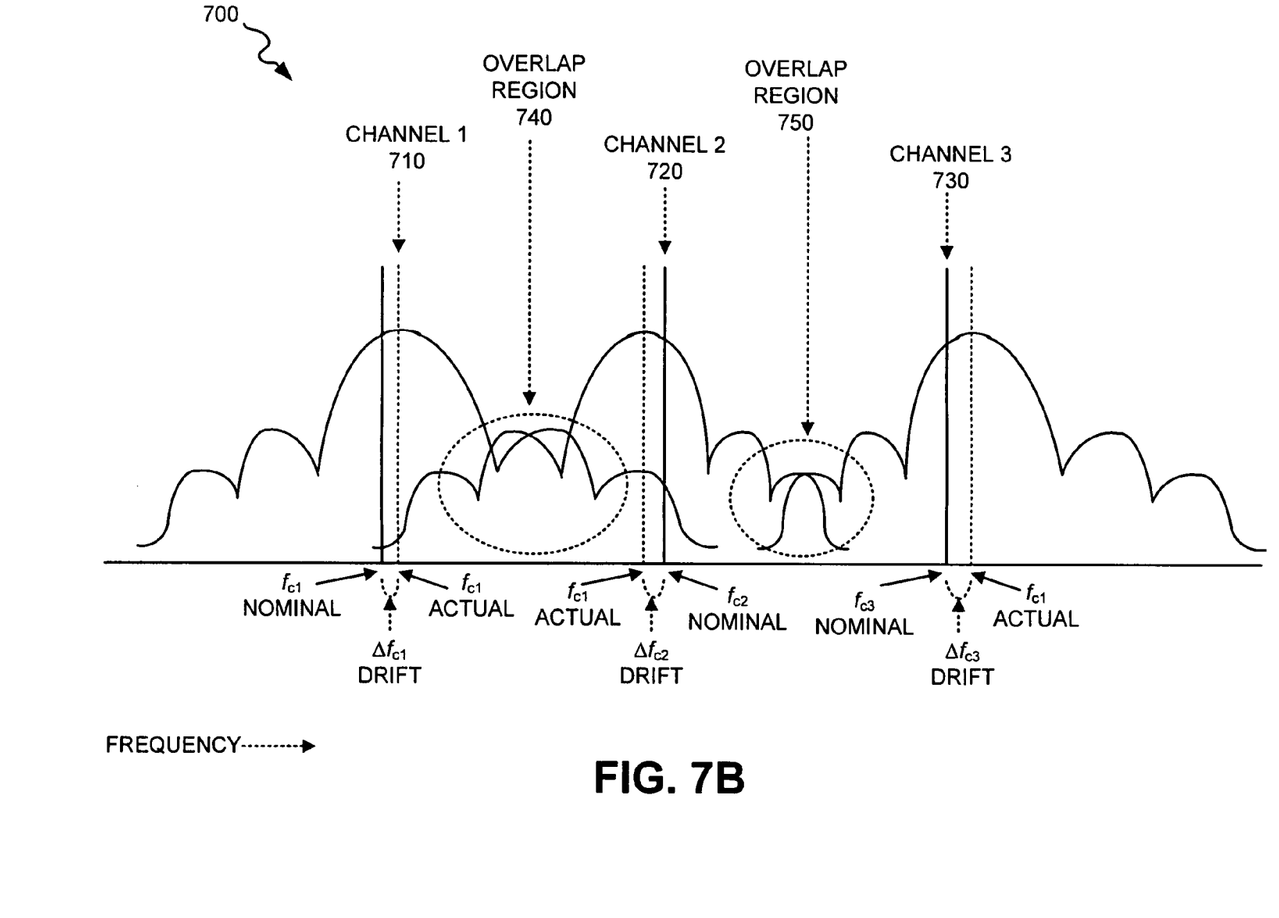
FIG. 7B illustrates three exemplary optical channels having narrow channel spacing and center frequencies that have drifted from nominal.

FIG. 7B illustrates additional channel spectrum and phase overlap that may occur due to center frequency drift associated with each channel. The center frequency drift may occur as a result of frequency error in CW laser 210 for a respective channel, or may occur due to frequency drift that may be induced by multiplexer 205 of DQPSK transmitter 110 or demultiplexer 300 of DQPSK receiver 120. As shown in FIG. 7B, each channel may have a drift in the center frequency from a nominal center frequency. For example, channel 1 710 may have an actual center frequency "$f_{c1}$ actual" that represents a frequency drift $\Delta f_{c1}$ from the nominal center frequency "$f_{c1}$ nominal." As another example, channel 2 720 may have an actual center frequency "$f_{c2}$ actual" that represents a frequency drift $\Delta f_{c2}$ from the nominal center frequency "$f_{c2}$ nominal." As an additional example, channel 3 730 may have an actual center frequency "$f_{c3}$ actual" that represents a frequency drift $\Delta f_{c3}$ from the nominal center frequency "$f_{c3}$ nominal."

Figure 7C:
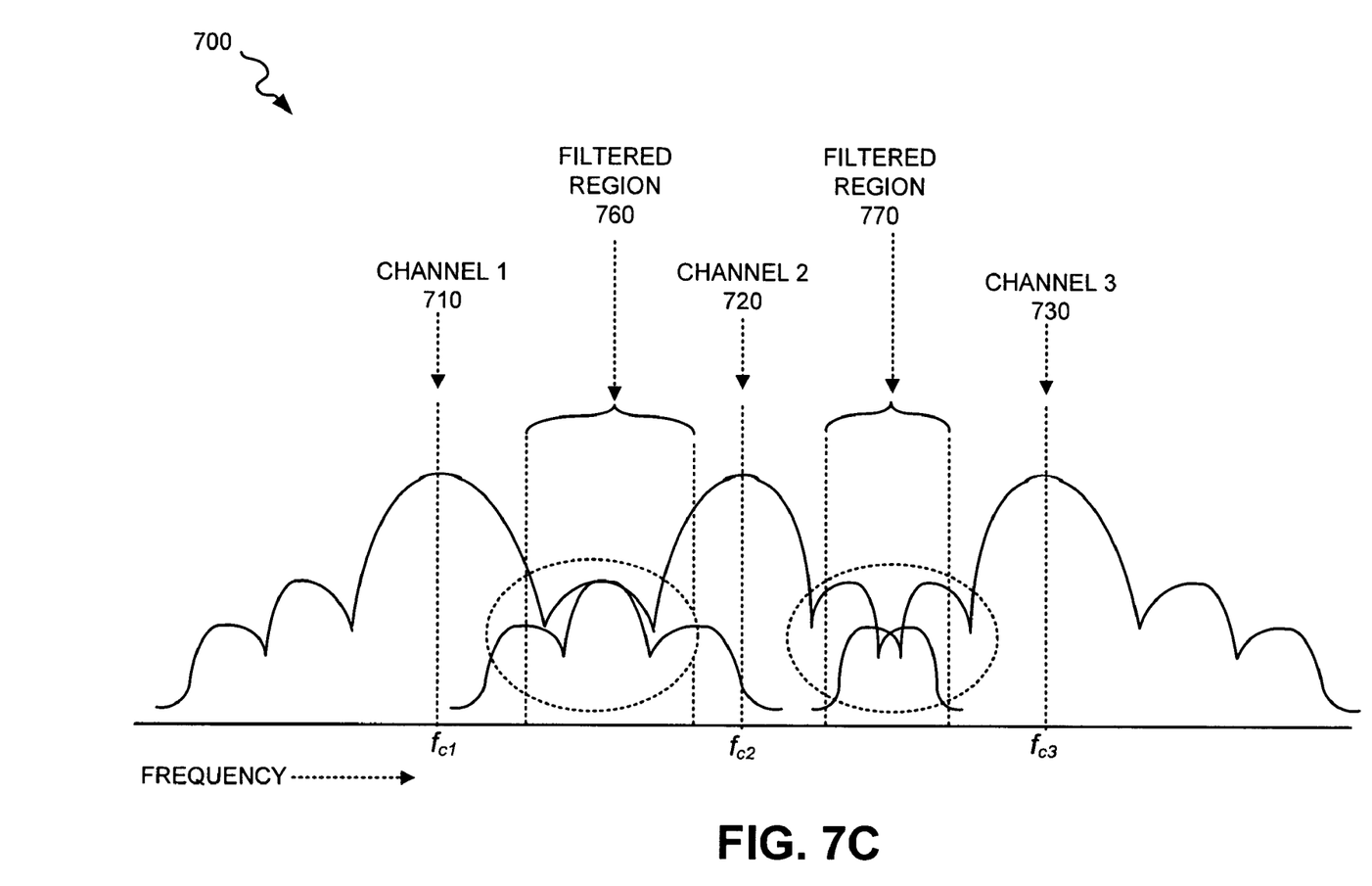
FIG. 7C illustrates the use of tunable optical filters in the DQPSK receiver of FIG. 3A to filter regions of overlap between the channel spectrums of the narrow channel spacing of FIGS. 7B and 7C.

To reduce optical cross-talk in the optical spectrum 700 depicted in FIG. 7A or 7B, tunable optical filters may be used in receiver 120. For example, tunable optical filters 332, 337, 355 and 360 of a channel DQPSK unit 305-x of receiver 120 may be used to decrease the cross-talk (e.g., filter the crosstalk) in the overlap regions 740 and 750 of spectrum 700 when the channels are narrowly spaced. As shown in FIG. 7C, tunable optical filters 332, 337, 355 and 360 of receiver 120 may act to filter regions 760 and 770 to eliminate or reduce channel overlap. Use of tunable optical filters in receiver 120, as described herein, improves optical performance particularly when employing narrow channel spacing (e.g., reduced adjacent channel cross-talk), improves optical pulse asymmetrical broadening in the frequency domain, improves polarization mode dispersion (PMD) and residual dispersion correction and tolerances, improves the margins for the DWDM tunable laser used in the DQPSK transmitter (e.g., increased tolerance in the laser central frequency drift from International Telecommunication Union (ITU) grid), relaxes the specifications in the design of the DQPSK transmitter, and may improve Optical Signal to Noise Ratio (OSNR) by, for example, 1-3 dB. The use of tunable optical filters in the optical receiver, as described herein, has particular applicability to narrow channel spacing Dense Wavelength Division Multiplexing (DWDM) systems as compared to wide channel spacing or coarse wave length division multiplexing (CWDM) systems. Optimum settings of each of tunable optical filters 332, 337, 355 and 360 of receiver 120 may be found through performance testing. Settings of each of the tunable filters may be determined that provide the desired improvements in performance at receiver 120.

Figure 8A:
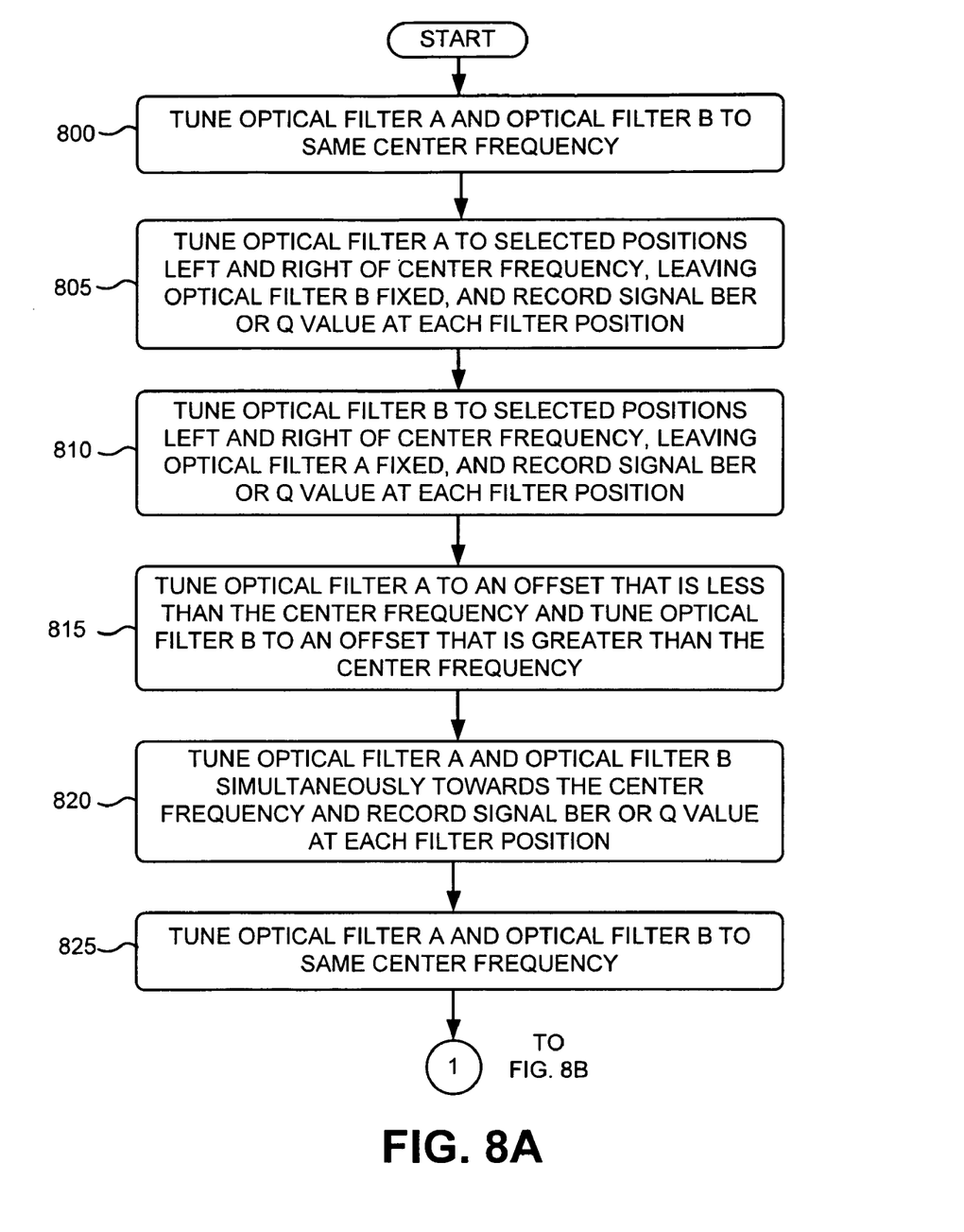
FIGS. 8A and 8B are flowcharts of an exemplary process for tuning the tunable optical filters in the DQPSK receiver of FIG. 3A.
Figure 8B:
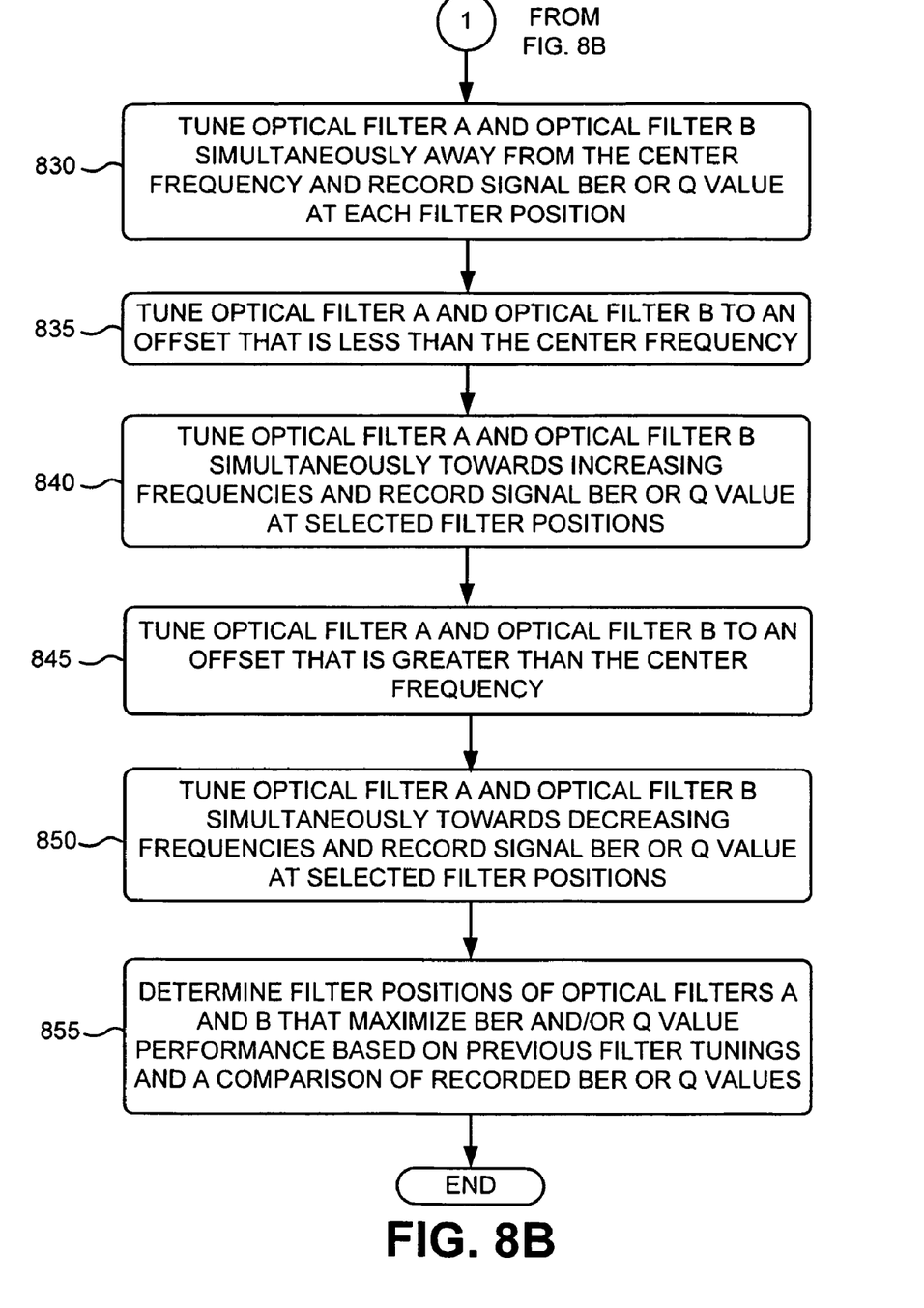

FIGS. 8A and 8B are flow diagrams of an exemplary process for tuning the tunable optical filters in receiver 120 to provide desired receiver performance improvements (e.g., reduction of channel crosstalk). The exemplary process of FIGS. 8A and 8B may be manually performed or may be performed by an automated performance testing system. The flow diagrams of FIGS. 8A and 8B refer to an "optical filter A" and an "optical filter B." "Optical filter A" may correspond to a tunable optical filter in a first arm of an interferometer of a channel DQPSK unit 305-x, and "optical filter B" may correspond to a tunable optical filter in a second arm of an interferometer of a channel DQPSK unit 305-x. For example, "optical filter A" may correspond to tunable optical filter 332 in arm 329 of interferometer 315 and "optical filter B" may correspond to tunable optical filter 337 in arm 330 of interferometer 315. As another example, "optical filter A" may correspond to tunable optical filter 355 in arm 352 of interferometer 315 and "optical filter B" may correspond to tunable optical filter 360 in arm 354 of interferometer 315.

The exemplary process may begin with the tuning of optical filter A and optical filter B to a same center frequency (block 800). The same center frequency may correspond to the nominal center frequency for the channel associated with the respective channel DQPSK unit 305-x. Optical filter A may then be tuned to selected positions left and right of the center frequency, leaving optical filter B fixed at the center frequency, and a signal bit error rate (BER) and/or Q value may be measured and recorded at each filter position (block 805). Optical filter B may then be tuned to selected positions left and right of the center frequency, leaving optical filter A fixed at the center frequency, and a signal BER and/or Q value may be measured and recorded at each filter position (block 810).

Optical filter A may be tuned to an offset from the center frequency that is less than the center frequency and optical filter B may be tuned to an offset from the center frequency that is greater than the center frequency (block 815). Optical filters A and B may then be tuned simultaneously, from their respective offsets, towards the center frequency and the signal BER and/or Q value may be measured and recorded at each filter position (block 820).

Optical filter A and optical filter B may be tuned to a same center frequency (block 825). Optical filter A and optical filter B may then be tuned simultaneously away from the center frequency and the signal BER and/or Q value may be measured and recorded at each filter position (block 830). In this block, optical filter A and optical filter B may be simultaneously tuned away from the center frequency in opposite directions. Thus, optical filter A may be tuned towards decreasing frequencies while optical filter B may be tuned towards increasing frequencies, and then optical filter A may be tuned towards increasing frequencies while optical filter B may be tuned towards decreasing frequencies.

Optical filter A and optical filter B may be tuned to an offset from the center frequency that is less than the center frequency (block 835). Optical filter A and optical filter B may then be simultaneously tuned towards increasing frequencies and the signal BER and/or Q value may be measured and recorded at selected filter positions (block 840).

Optical filter A and optical filter B may be tuned to an offset from the center frequency that is greater than the center frequency (block 845). Optical filter A and optical filter B may then be simultaneously tuned towards decreasing frequencies and the signal BER and/or Q value may be measured and recorded at selected filter positions (block 850).

The filter positions of optical filters A and B that maximize BER and/or Q value performance may be determined based on previous filter tunings and a comparison of recorded BER and/or Q values (block 855). Recorded BER and/or Q values associated with each of the filter tuning blocks (e.g., blocks 805, 810, 820, 830, 840 and 850 of FIGS. 8A and 8B) may be compared with one another to deduce the optimum filter positions of optical filters A and B that maximize BER and/or Q value performance. For example, the recorded BER values associated with each of the filter tuning blocks of FIGS. 8A and 8B may be compared with one another to deduce the optimum filter positions of optical filters A and B that produce the smallest BER.

The blocks of the flow diagram of FIGS. 8A and 8B have been described with respect to tuning optical filters A and B, which may correspond to tunable optical filters 332 and 337 or 355 and 360 of FIG. 3B. In additional exemplary embodiments, tunable electrical filters 335 and 340 or 359 and 364 may be tuned in conjunction with the tuning of optical filters 332 and 337 or 355 and 360 to maximize BER and/or Q value performance.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Modifications and variations are possible in light of the specification, or may be acquired from practice of the invention. For example, embodiments have been described herein with respect to a DQPSK receiver. However, tunable optical filters (and tunable electrical filters) may be similarly employed in the DPSK receiver of a DPSK system for similar improvements in optical performance, as described herein.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An optical receiver comprising:
    a first interferometer including a plurality of arms; and
    first tunable optical filters, each filter of the first tunable optical filters connected in series with an arm of the plurality of arms of the first interferometer, where each first tunable optical filter is tuned to filter a region of overlap in an optical frequency spectrum between adjacent optical channels.

2. The optical receiver of claim 1, where the first tunable optical filters comprise tunable band reject optical filters.

3. The optical receiver of claim 2, where the tunable band reject optical filters comprise narrowband tunable thin film filters.

4. The optical receiver of claim 1, where the optical receiver comprises a differential quadrature phase shift keying (DQPSK) or differential phase shift keying (DPSK) optical receiver.

5. The optical receiver of claim 1, where one of the arms of the plurality of arms of the first interferometer includes a delay element.

6. The optical receiver of claim 1, where the adjacent optical channels comprise a plurality of optical channels having narrow channel spacing and where the first tunable optical filters filter out adjacent channel cross talk.

7. The optical receiver of claim 1, where the optical receiver comprises at least a 100 Gigabits/second optical receiver.

8. The optical receiver of claim 1, further comprising:
    a first photodetector coupled in series with each first tunable optical filter.

9. The optical receiver of claim 8, further comprising:
    a first tunable electrical filter coupled in series with an output of the first photodetector.

10. The optical receiver of claim 8, where the first photodetector comprises one of a positive intrinsic negative (PIN) diode, an avalanche photodetector (APD) or a photomultiplier tube (PMT).

11. The optical receiver of claim 1, further comprising:
    a second interferometer including a plurality of arms; and
    second tunable optical filters, each filter of the second tunable filters connected in series with an arm of the plurality of arms of the second interferometer, where each second tunable optical filter is tuned to filter a region of overlap in the optical frequency spectrum between adjacent optical channels.

12. The optical receiver of claim 11, where one of the arms of the plurality of arms of the second interferometer includes a delay element.

13. The optical receiver of claim 11, further comprising:
    a second photodetector coupled in series with each second tunable optical filter.

14. The optical receiver of claim 13, further comprising:
    a second tunable electrical filter coupled in series with an output of the second photodetector.

15. The optical receiver of claim 13, where the second photodetector comprises a positive intrinsic negative (PIN) diode, an avalanche photodetector (APD) or a photomultiplier tube (PMT).

16. A system comprising:
    a first interferometer including a first arm and a second arm, where the first arm of the first interferometer includes a first delay element;
    a first tunable optical filter and a first photodetector connected in series in the first arm of the first interferometer; and
    a second tunable optical filter and a second photodetector connected in series in the second arm of the first interferometer.

17. The system of claim 16, further comprising:
a first tunable electrical filter connected in series with an output of the first photodetector; and
a second tunable electrical filter connected in series with an output of the second photodetector.

18. The system of claim 16, where the system comprises a differential quadrature phase shift keying (DQPSK) or differential phase shift keying (DPSK) optical receiver.

19. The system of claim 16, where the first and second tunable optical filters comprise tunable band reject optical filters.

20. The system of claim 16, further comprising:
a second interferometer including a first arm and a second arm, where the first arm of the second interferometer includes a second delay element;
a third tunable optical filter and a third photodetector connected in series in the first arm of the second interferometer; and
a fourth tunable optical filter and a fourth photodetector connected in series in the second arm of the second interferometer.

21. The system of claim 20, where the third and fourth tunable optical filters comprise tunable band reject optical filters.

22. The system of claim 20, further comprising:
a first tunable electrical filter connected in series with an output of the third photodetector; and
a second tunable electrical filter connected in series with an output of the fourth photodetector.

23. The system of claim 20, where the system receives optical signals over at least two adjacent optical channels that have narrow channel spacing.

24. The system of claim 23, where at least one of the first, second, third or fourth tunable optical filters is tuned to filter a region of overlap in an optical frequency spectrum between the adjacent optical channels.

25. A method comprising:
selectively tuning a first tunable optical filter in a first arm of an interferometer, and a second tunable optical filter in a second arm of the interferometer, of an optical receiver;
measuring and recording at least one of bit error rates (BERs) or Q-values associated with the optical receiver during the selective tuning of the first and second tunable optical filters; and
determining filter positions of the first and second tunable optical filters that maximize BER or Q-value performance based on the recorded BERs or Q-values.

* * * * *